(12) United States Patent
Weigelt et al.

(10) Patent No.: US 11,255,428 B2
(45) Date of Patent: Feb. 22, 2022

(54) SECURING DEVICE FOR SECURING A STATIONARY STATE OF AN ELECTRIC VEHICLE

(71) Applicant: Dr. Ing. h.c. F. Porsche Aktiengesellschaft, Stuttgart (DE)

(72) Inventors: Thomas Weigelt, Oberriexingen (DE); Raphael Thomann, Karlsruhe (DE); Gary Avery, Ludwigsburg (DE); Daniel Knoblauch, Leonberg (DE); Gerhard Spengler, Jettingen (DE)

(73) Assignee: Dr. Ing. h.c. F. Porsche Aktiengesellschaft

( * ) Notice: Subject to any disclaimer, the term of this patent is extended or adjusted under 35 U.S.C. 154(b) by 122 days.

(21) Appl. No.: 16/707,096

(22) Filed: Dec. 9, 2019

(65) Prior Publication Data

US 2020/0248796 A1 Aug. 6, 2020

(30) Foreign Application Priority Data

Feb. 4, 2019 (DE) .......................... 102019102727.6

(51) Int. Cl.
*F16H 61/22* (2006.01)
*F16H 63/36* (2006.01)
*F16H 3/00* (2006.01)

(52) U.S. Cl.
CPC ............ *F16H 61/22* (2013.01); *F16H 3/006* (2013.01); *F16H 63/36* (2013.01); *F16H 2003/008* (2013.01); *F16H 2061/223* (2013.01)

(58) Field of Classification Search
CPC .......... F16H 61/22; F16H 63/36; F16H 3/006; F16H 2003/008; F16H 2061/223;
(Continued)

(56) References Cited

U.S. PATENT DOCUMENTS 6,074,321 A * 6/2000 Maeda ..................... B60K 1/00
475/221
9,227,506 B2 1/2016 Mair et al.
(Continued)

FOREIGN PATENT DOCUMENTS

CN 102121532 A 7/2011
CN 102537338 A 7/2012
(Continued)

OTHER PUBLICATIONS

Chinese Office Action for Chinese Application No. 202010075132.6, dated Mar. 30, 2021, with translation, 9 pages.

*Primary Examiner* — Victor L MacArthur
(74) *Attorney, Agent, or Firm* — RatnerPrestia

(57) ABSTRACT

A securing device for securing a stationary state of an electric vehicle includes a gearshift interlock device and a differential interlock device. The gearshift interlock device has a gearshift interlock drive with a gearshift interlock shaft for driving a gearshift interlock between a gearshift interlock position and a gearshift release position. The differential interlock device has a differential interlock drive with a differential interlock shaft for driving a differential interlock between a differential interlock position and a differential release position. The gearshift interlock shaft and the differential interlock shaft are connected to one another in a drive-transmitting fashion.

9 Claims, 6 Drawing Sheets

(58) Field of Classification Search
CPC .. F16H 48/08; F16H 63/3483; F16H 63/3416; F16H 63/3466; F16H 2200/0021; F16H 48/20; F16H 48/30; B60T 1/062; B60K 17/16

See application file for complete search history.

(56) References Cited

U.S. PATENT DOCUMENTS

| | | | |
|---|---|---|---|
| 9,272,690 B2 | 3/2016 | Burgardt | |
| 10,391,998 B2 | 8/2019 | Okubo et al. | |
| 2009/0127954 A1* | 5/2009 | Mogi | B60K 17/12 310/90 |
| 2018/0297401 A1* | 10/2018 | Liu | B60T 8/32 |

FOREIGN PATENT DOCUMENTS

| | | |
|---|---|---|
| CN | 103732433 A | 4/2014 |
| CN | 204573075 U | 8/2015 |
| CN | 108068790 A | 5/2018 |
| DE | 19710975 A1 | 9/1998 |
| DE | 102012017817 A1 | 3/2014 |
| DE | 102016217122 A1 | 3/2018 |
| GB | 2531337 A | 4/2016 |

\* cited by examiner

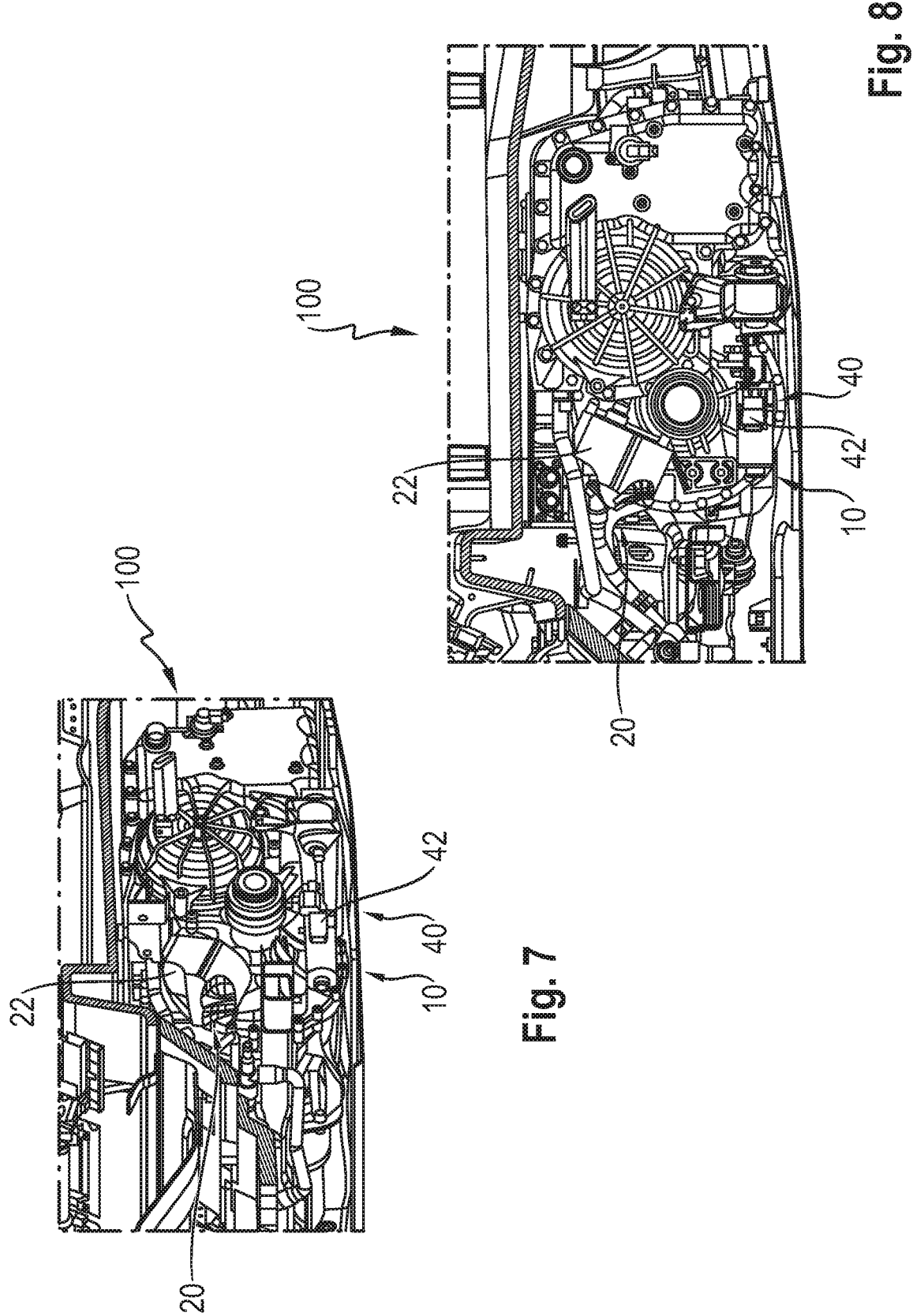

SECURING DEVICE FOR SECURING A STATIONARY STATE OF AN ELECTRIC VEHICLE

CROSS-REFERENCE TO RELATED APPLICATION

This application claims priority to German Patent Application No. 10 2019 102 727.6, filed Feb. 4, 2019, the content of such application being incorporated by reference herein in its entirety.

FIELD OF THE INVENTION

The present invention relates to a securing device for securing a stationary state of an electric vehicle, to a method for securing a stationary state of an electric vehicle and to an electric vehicle having a securing device according to aspects of the invention.

BACKGROUND OF THE INVENTION

It is known that in electric vehicles and also in vehicles which are operated in a normal fashion the vehicle has to be secured in the stationary state against rolling away. In vehicles with manual transmissions this is usually made available by engaging the first gear. A parking brake in the form of a handbrake can also additionally ensure the securing of the stationary state in such a case. In automatic transmissions, a separate gearshift interlock has to be engaged, which gearshift interlock is also known as a parked position with the sign ("P") in the automatic transmission. In parking situations of the vehicle in an inclined parked position, that is to say for example on a slope, it is, however, usually additionally necessary additionally to use a parking brake as a frictionally locking brake.

A disadvantage of the known solutions is the high structural expenditure which arises as a result of the combination of two brake devices or securing devices which are completely separate from one another. In addition to an interlock device in an automated transmission, a separate frictionally locking brake device also has to be provided which is necessary exclusively in a small number of use situations, for example when parking on a slope. This gives rise to an increased amount of required space, increased weight and increased costs when manufacturing such a vehicle.

FIELD OF THE INVENTION

Features and details which are described in conjunction with the securing device according to aspects of the invention apply, of course, also in conjunction with the method according to aspects of the invention and the electric vehicle according to aspects of the invention, and vice versa, so that with respect to the disclosure of the individual aspects of the invention, reference is always/can always be made in a reciprocal fashion.

According to aspects of the invention, a securing device for securing a stationary state of an electric vehicle is proposed. This securing device has a gearshift interlock device and a differential interlock device. The gearshift interlock device is equipped with a gearshift interlock drive with a gearshift interlock shaft for driving a gearshift interlock means between a gearshift interlock position and a gearshift release position. Furthermore, the differential interlock device is equipped with a differential interlock drive with a differential interlock shaft for driving a differential interlock means between a differential interlock position and a differential release position. In this context, the gearshift interlock shaft and the differential interlock shaft are also connected to one another in a drive-transmitting fashion.

In the case of a securing device according to aspects of the invention, said device can be used, in particular, in a pure electric vehicle. However, possible uses are basically also conceivable in electric vehicles with combined drives, that is to say so-called hybrid vehicles. It would be desirable to make the securing device free of friction, that is to say free of a frictionally locking parking brake. According to aspects of the invention, a combination of two securing devices are used which both act on the drive train of the electric vehicle.

The first of the two securing devices is the gearshift interlock device. Such a gearshift interlock device can be based on known solutions, in particular the so-called park position when using an automatic transmission, as a gearshift interlock device. In order to be able to carry out a movement of the gearshift interlock device between a gearshift release position and a gearshift interlock position, according to aspects of the invention a gearshift interlock drive is provided. The latter can be, for example, of an electromotive design. However, a manual or partially manual gearshift interlock drive according to the present invention is also conceivable. The drive movement is passed on by the gearshift interlock drive via the gearshift interlock shaft. This drive movement is, in particular, a rotational drive movement which brings about drive rotation of the gearshift interlock shaft. During the rotation of the gearshift interlock shaft, the gearshift interlock means can be movable, in particular then in a translatory fashion, between the gearshift interlock position and the gearshift release position. Of course, it is also conceivable to provide additional resetting means, for example spring-elastic resetting means.

In addition to the gearshift interlock device a differential interlock device is then additionally provided. As the name of this differential interlock device already states, this differential interlock device acts according to the present invention on the differential of the electric vehicle, that is to say also on part of the gearshift device of the electric vehicle. The differential interlock device is also equipped with a differential interlock drive which can have an electromotive embodiment. However, basically a manual or partially manual drive embodiment of the differential gearshift drive is also conceivable here. In this embodiment, the differential interlock shaft is also designed to take up the differential interlock movement, in particular in the form of a rotational movement, and pass it on. The movement of the differential interlock means can then also preferably be carried out in a translatory fashion by virtue of this differential drive movement between the differential release position and the differential interlock position.

The basic concept according to aspects of the invention is then achieved by virtue of the fact that the gearshift interlock shaft and the differential interlock shaft are connected to one another in a drive-transmitting fashion. This drive-transmitting connection relates, in particular, to a drive movement from the respective release position and to the respective interlock position of the gearshift interlock device and of the differential interlock device. This brings about very cost-effective redundancy in the embodiment of the entire system of the securing device, as will be explained briefly below with respect to the functionality.

When a vehicle is parked, the stationary state of the electric vehicle must be secured. To do this, the driver engages, for example, the park position in the gearshift selector lever of the electric vehicle. The gearshift interlock movement is therefore triggered by means of the gearshift interlock drive, in order to transfer the gearshift interlock means from the gearshift release position out of the driving mode into the gearshift interlock position, that is to say the securing mode, by means of the gearshift interlock shaft. As a result of the fact that the gearshift interlock shaft is then additionally connected in a drive-transmitting fashion to the differential interlock shaft when the drive movement is transmitted to the gearshift interlock means, this drive movement can at least to a certain extent also be transmitted into the differential interlock shaft. In other words, the transmission drive movement is then divided and made available to both interlock means, that is to say the gearshift interlock means and the differential interlock means, in order also to move the differential interlock means out of the differential release position into the differential interlock position. Even in the event of a failure of the differential interlock drive it is therefore ensured that in the case of a securing device according to aspects of the invention both interlock means, that is to say the gearshift interlock means and the differential interlock means, can be moved into the respective interlock position, starting from the gearshift interlock drive alone.

The above explanation functions also in a converse situation, that is to say in the event of failure or partial failure of the gearshift interlock drive. By virtue of the drive-transmitting connection it is also possible to transmit a drive movement of the differential interlock drive from the differential interlock shaft to the gearshift interlock shaft, so that starting from the differential interlock drive, the differential interlock movement moves not only the differential interlock means out of the differential release position into the differential interlock position but additionally also the gearshift interlock means out of the gearshift release position into the gearshift interlock position.

The two failure situations described above with the corresponding redundant securement are, of course, also effective in the opposite direction, that is to say out of the interlock position into the respective release position.

A redundant mode is achieved by virtue of the coupling of the gearshift interlock drive to the differential interlock drive. By virtue of the described coupling, the embodiment of the individual drives, that is to say of the gearshift interlock drive, on the one hand, and of the differential interlock drive on the other, can be made smaller, more compact and more cost-effective. The brakes which are actually present in the vehicle can also be made correspondingly smaller, since they can be tailored exclusively to a travel brake situation, and therefore with consideration of a regenerative braking advantage. The securement of the stationary state is in this way made completely independent of the travel brake functionality of the electric vehicle. Such a securing device is therefore configured in a particularly autonomous and uniform fashion and can even be integrated into the transmission housing with particularly low expenditure.

The above securing device according to the present invention can also be advantageously embodied if the differential interlock means has a differential interlock section which, in the differential interlock position, engages in a positively locking fashion in an opposing differential interlock section. Positively locking engagement is conceivable according to aspects of the invention, for example, in the form of a dog clutch or a spline shaft connection, for example using a sliding sleeve. As an alternative to possible basic frictionally locking interlock functionalities, positive locking gives rise to increased safety. As a result of the fact that the securing device only has to ensure securement in a stationary state of the electric vehicle, there is also therefore no friction in engagement for the reduction of kinetic energy necessary here. The hard securing means is provided with the increased advantages here, since on the one hand it is essentially free of wear and on the other hand provides the advantages according to aspects of the invention in a particularly compact manner.

It is a further advantage if in a securing device according to aspects of the invention the travel transmission ratio between the gearshift interlock position and the gearshift release position corresponds, or corresponds essentially, to the travel transmission ratio between the differential interlock position and the differential release position. A travel transmission ratio corresponds according to the present invention to the overall travel between the interlock position and the associated release position and the corresponding transmission ratio of the drive movement. The combination in the travel transmission ratio therefore indicates, as it were, the duration of the movement between the interlock position and the release position. By virtue of the coupling of the gearshift interlock drive and the differential interlock drive and the correspondence between the two travel transmission ratios it is possible to ensure that the movements are able to be carried out at least partially synchronously or even simultaneously or essentially at the same time. Irrespective of whether both interlock drives are available with their complete functionality, the correlation of the travel transmission ratios causes the respective interlock position and/or the respective release position to be reached simultaneously or essentially simultaneously.

It can also be advantageous if in the case of a securing device according to aspects of the invention the gearshift interlock means and/or the differential interlock means have/has a spring compensation means for cancelling a blockage position during the respective drive movement. Such a spring compensation means forms a possible way of carrying out compensation in a blockage position, that is to say for example a blockage in a tooth to tooth position in a dog clutch. Therefore, it is possible to shift the respective interlock means into the interlock position, in order to ensure secure latching in the respective interlock position even in a blockage situation. The securing functionality is therefore significantly improved.

Further advantages can be achieved if in the case of a securing device according to aspects of the invention the gearshift interlock device acts on a multi-gear transmission. Therefore, in electric motors it is also possible to use an input transmission in order to ensure the desired drive functionality. However, in particular multi-gear transmissions, preferably with two or more forward gears, are provided, in order to be able to make available large speed differences at the electric vehicle even in the case of relatively low power electric motors. In such a multi-gear transmission the gearshift interlock device is installed and can additionally be embodied as the known park position.

Furthermore, it entails advantages if in a securing device according to aspects of the invention the gearshift interlock shaft and/or the differential interlock shaft have/has a coupling section for a coupled transmission from the gearshift interlock drive and the differential interlock drive via the gearshift interlock shaft and/or the differential interlock shaft. Such a coupled transmission is therefore a common section for both movements. In other words, in the coupling section, the gearshift interlock shaft can transmit both the gearshift interlock movement and the differential interlock movement and/or conversely the differential interlock shaft can transmit, in its coupling section, the gearshift interlock movement and the differential interlock movement. The compactness of the overall system can be increased, and therefore the required installation space reduced, through the common transmission possibility in the respective coupling section.

It is also advantageous in the case of a securing device according to aspects of the invention if the gearshift interlock device and/or the differential interlock device have/has a freewheeling section for freewheeling of the gearshift interlock shaft and/or of the differential interlock shaft counter to the drive direction. This is to be understood as meaning that a freewheel is provided for the movement from the respective interlock position into the respective release position, in particular if a defect of the respective drive occurs. This leads to a situation in which the intact drive does not have to entrain the respectively defective drive so that no unnecessarily large resistance occurs if in such a situation of a redundant use a single functioning drive has to operate the gearshift interlock device and the differential interlock device in a jointly combined fashion.

Likewise, the subject matter of the present invention is a method for securing a stationary state of an electric vehicle, in particular by means of a securing device according to aspects of the invention, comprising the following steps:
carrying out a gearshift interlock movement for moving a gearshift interlock means out of a gearshift release position into a gearshift interlock position,
carrying out a differential interlock movement for moving a differential interlock means out of a differential release position into a differential interlock position.

By virtue of the reference to a securing device according to aspects of the invention, a method according to aspects of the invention provides the same advantages as have been explained in detail with reference to a securing device according to aspects of the invention.

It is also advantageous if in the case of a method according to aspects of the invention the gearshift interlock movement and the differential interlock movement are carried out at least partially simultaneously, in particular with the same starting point and/or same end point. This gives rise to a synchronous or at least partially synchronous execution of these two interlock movements. The coupling can be made available, for example, in a geometric structural fashion as has been explained with reference to the travel transmission ratios. However, according to the present invention, a coupling by means of open-loop and/or closed-loop control, that is to say a software solution of this coupling, is basically also conceivable.

An electric vehicle having a securing device according to aspects of the invention is likewise the subject matter of the present invention. Therefore, an electric vehicle according to aspects of the invention provides the same advantages as have been explained in detail with reference to a securing device according to aspects of the invention.

BRIEF DESCRIPTION OF THE DRAWINGS

Further advantages, features and details of the invention emerge from the following description in which exemplary embodiments of the invention are described in detail with reference to the drawings. Here the features which are mentioned in the claims and in the description are each individually essential to the invention per se or in any desired combination. In the drawings, in each case in a schematic form:

FIG. 7 shows the embodiment in FIGS. 3 to 6 in an isometric illustration of a detail,
FIG. 8 shows the embodiment in FIG. 7 in a lateral illustration.

DETAILED DESCRIPTION OF THE INVENTION

Figure 2:
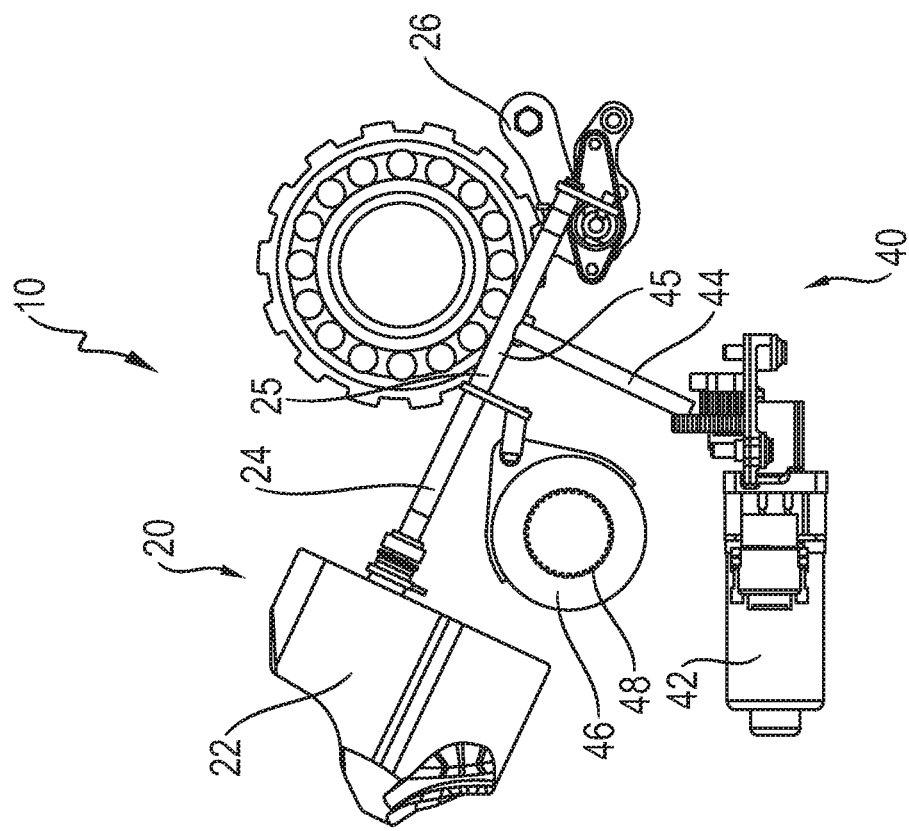
FIG. 2 shows the embodiment in FIG. 1 in a lateral illustration.
Figure 1:
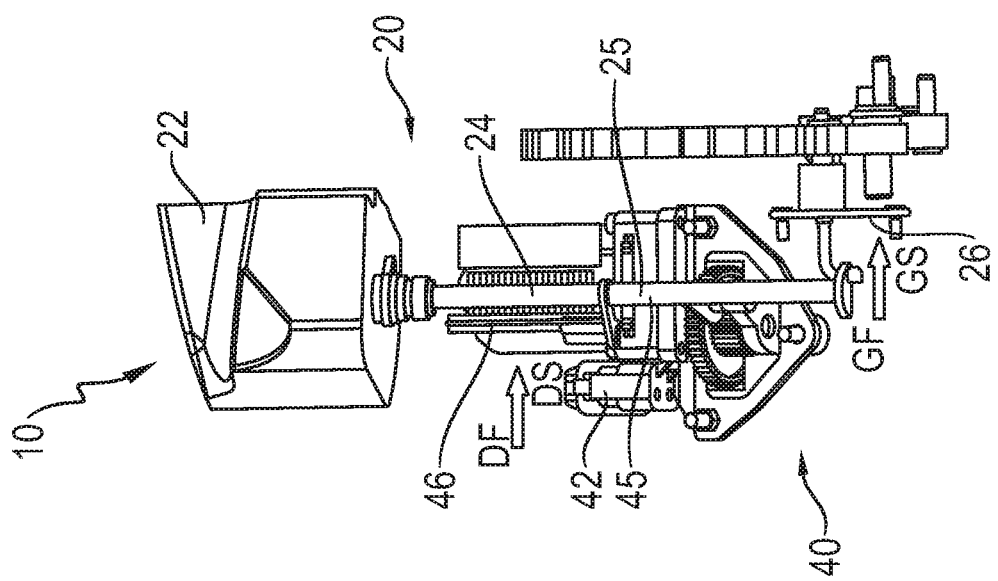
FIG. 1 shows an embodiment of a securing device according to aspects of the invention.

FIGS. 1 and 2 show schematic views of a securing device 10 according to aspects of the invention. The latter is provided with two separate drives, specifically the gearshift interlock drive 22 and the differential interlock drive 42. The gearshift interlock drive 22 and the differential interlock drive 42 are respectively embodied either as an electromechanical actuator or hydraulic actuator. Therefore, a gearshift interlock device 20 and a differential interlock device 40 are formed. For the method of functioning, the two shafts, specifically the gearshift interlock shaft 24 and the differential interlock shaft 44 have a drive connection to one another via a respective coupling section 25 and 45. The coupling of the gearshift interlock drive 22 to the differential interlock drive 42 provides a redundant mode.

Now, in order to engage a securing situation, that is to say to secure the drive wheels, at least one of the two drives 22 and 42 is switched on. In the normal mode, both the gearshift interlock drive 22 and the differential interlock drive 42 are switched on in order to generate the respective interlock movement. This movement is in both cases here a rotational movement which is output via the gearshift interlock shaft 24 and the differential interlock shaft 44. The corresponding interlock movement acts here in each case in a redundant fashion via the two coupling sections 25 and 45, on the one hand on the gearshift interlock means 26 and on the other hand on the differential interlock means 46. Both the gearshift interlock means 26 and the differential interlock means 46 are embodied here to perform positively locking engagement in order to make available the corresponding interlock function. In FIG. 2, the lighting projections or nose projections of the differential interlock section 48 of the differential interlock means 46 can already be seen. A failure of one of the two drives 22 and 42 has occurred, so that the respectively still intact drive 22 or 42 can move both interlock means, that is to say the gearshift interlock means 26 and the differential interlock means 46 only into the respective interlock position through the coupling via the coupling section 25 and 45.

In FIG. 1, the movement of the arrow also indicates the respective direction of movement out of the differential release position DF into the differential interlock position DS or out of the gearshift release position GF into the gearshift interlock position GS.

Figure 3:
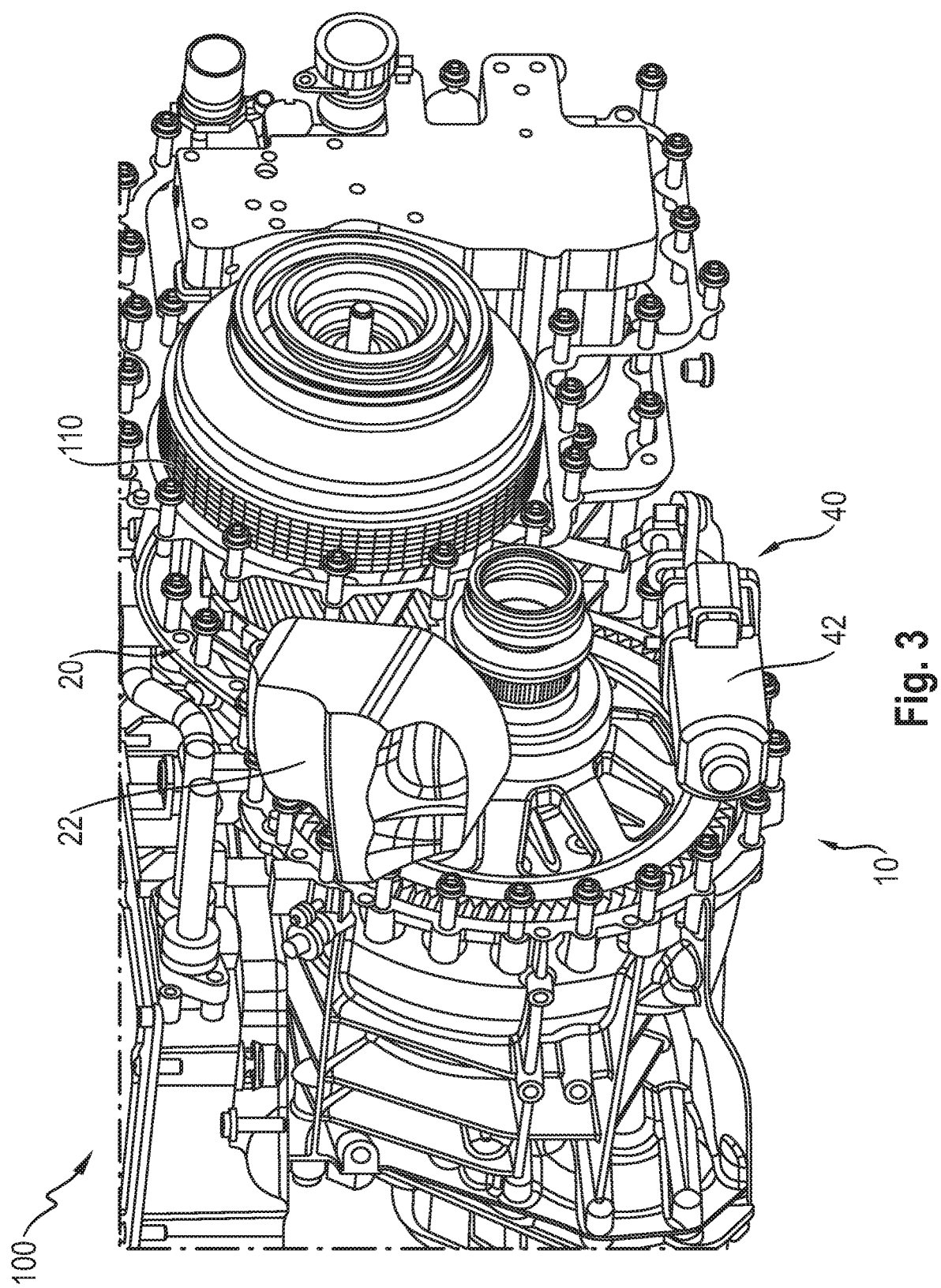
FIG. 3 shows the embodiment in FIGS. 1 and 2 on an electric vehicle.
Figure 4:
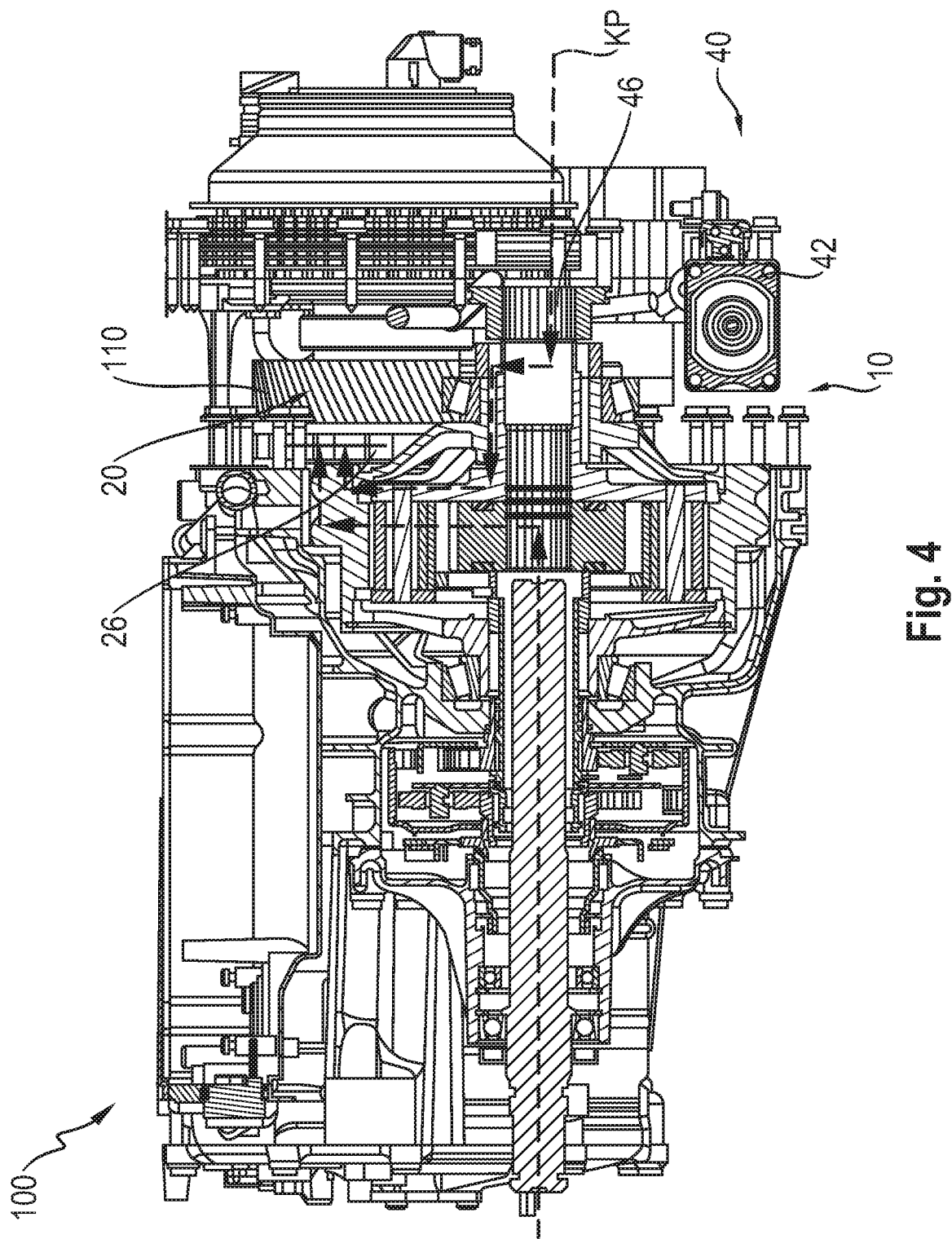
FIG. 4 shows the embodiment in FIG. 3 in a lateral illustration.

FIGS. 3 and 4 show schematically the attachment to an electric vehicle 100, here with a multi-gear transmission 110. The method of functioning corresponds to that described with respect to FIGS. 1 and 2. Correspondingly, a force path KP starting from the drive wheels is illustrated in FIG. 4. This force path KP conducts the force which is applied into the multi-gear transmission 110 by, for example, the drive wheels by the downgrade force when the vehicle is parked on a slope. This force along the force path KP is then supported doubly, specifically, on the one hand, within the multi-gear transmission 110 at the gearshift interlock means 26 of the gearshift interlock device 20 and, on the other hand, at the differential interlock means 46 of the differential interlock device 40.

Figure 6:
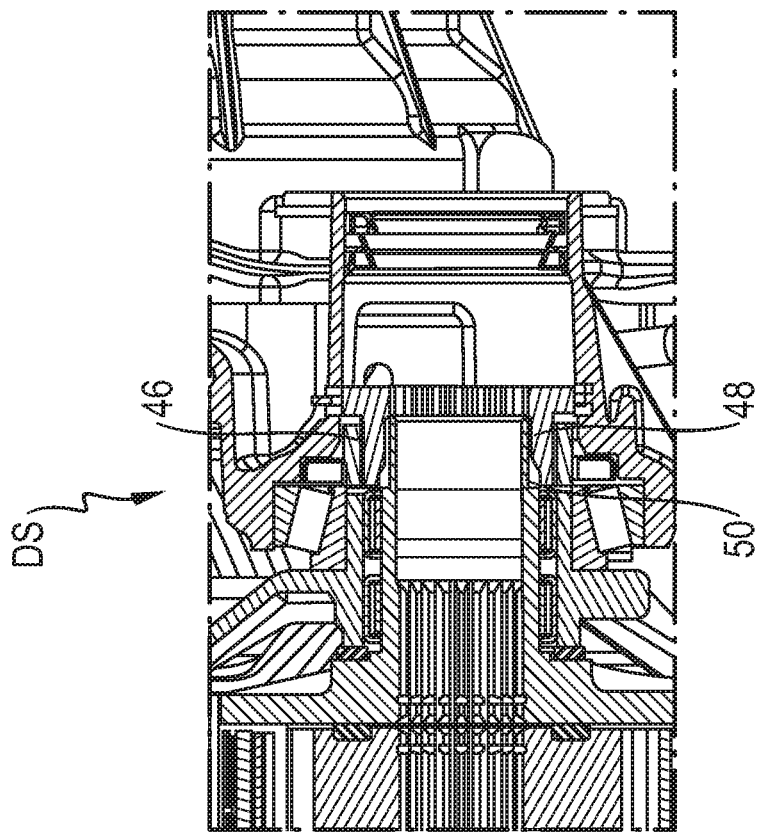
FIG. 6 shows the embodiment in FIG. 5 in the differential interlock position.
Figure 5:
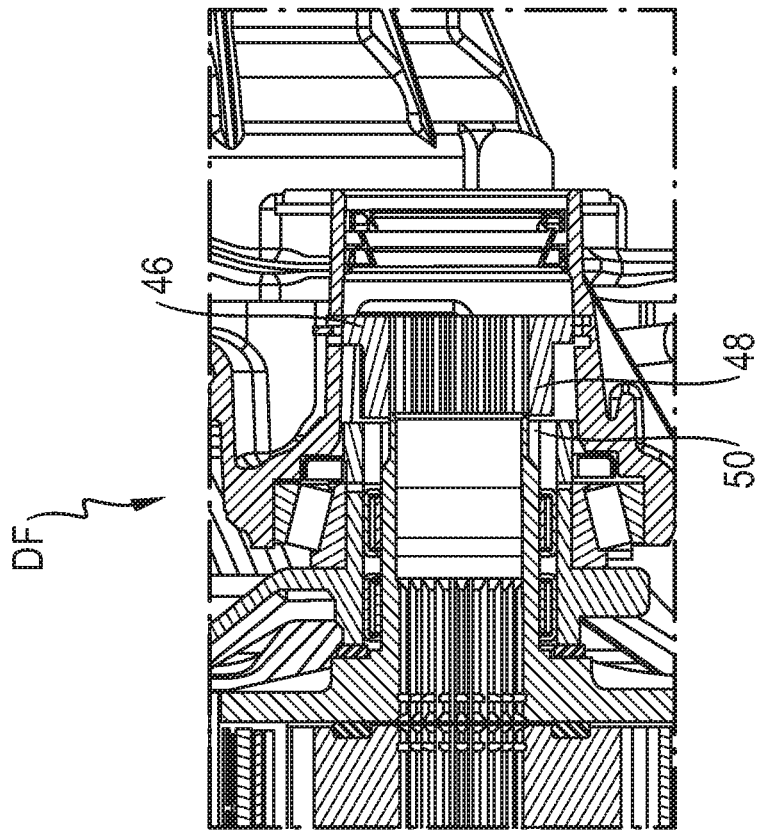
FIG. 5 shows a partial detail of the embodiment in FIGS. 3 and 4.

The interlock effect of the differential interlock means 46 is also illustrated well in FIGS. 5 and 6. While FIG. 5 shows the differential release position, the respective differential interlock section 48 of the differential interlock means 46, here embodied as a spline shaft, is latched into the respective opposing differential interlock section 50 in FIG. 6 in the differential interlock position DS.

FIGS. 7 and 8 show the integration into the electric vehicle 100, which said FIGs. also show the compact design. In particular, the existing gearshift interlock drive 22 is also used for a securing device 10 according to aspects of the invention so that only the differential interlock device 46, and there mainly the differential interlock drive 42, have to be integrated as additional components into the electric vehicle 100.

Figure 9:
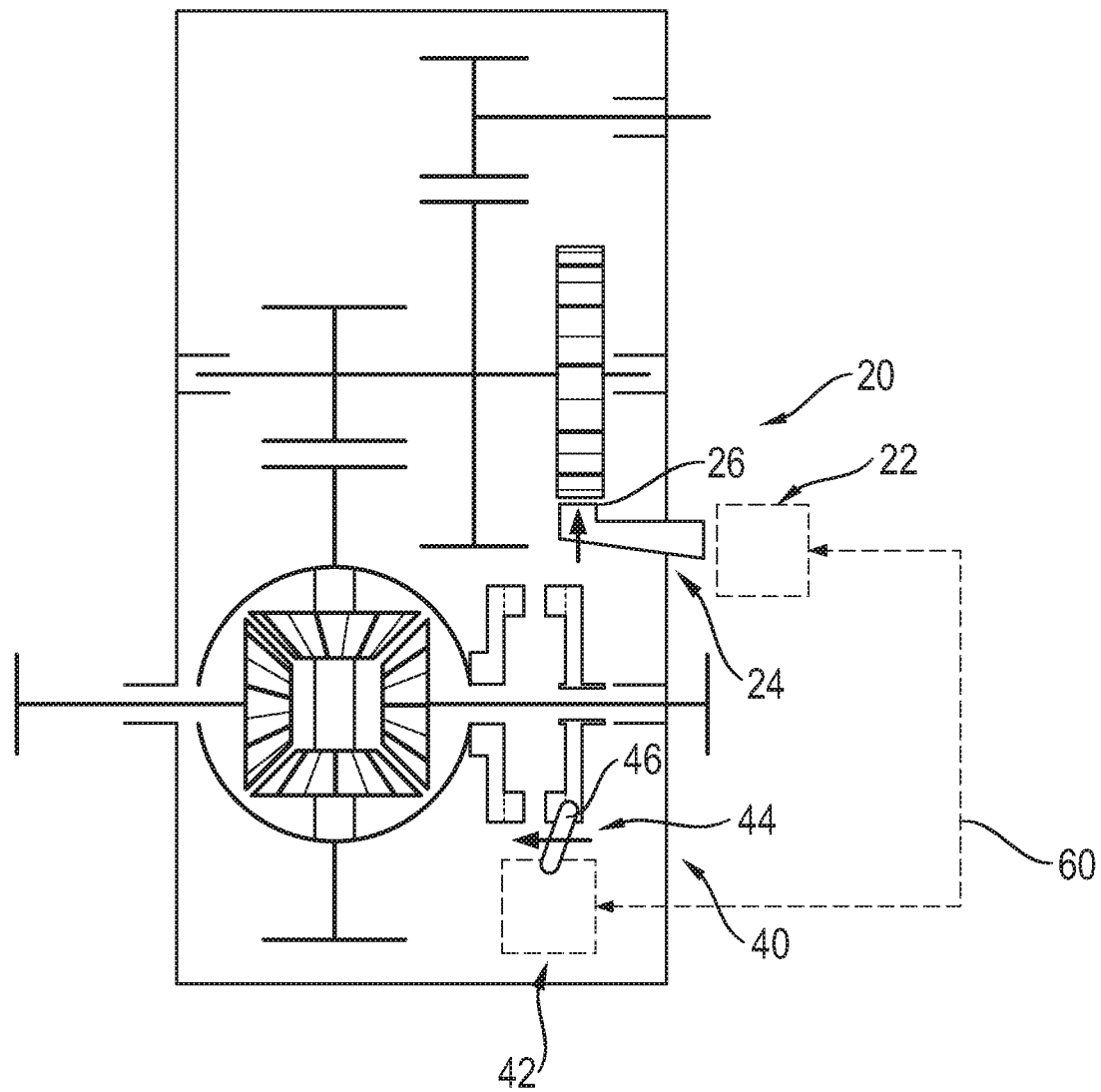
FIG. 9 shows a schematic illustration of the securing device according to aspects of the invention.

Finally, FIG. 9 shows the securing device 10 for securing a stationary state of an electric vehicle 100 in a schematic configuration. The securing device 10 is composed, on the one hand, of a gearshift interlock device 20 and a differential interlock device 40, wherein the gearshift interlock device 20 has an electromechanical or hydraulic gearshift interlock drive 22 with a gearshift interlock shaft 24 which is responsible for driving a gearshift interlock means 26 between a gearshift interlock position GS and a gearshift release position GF. The differential interlock device 40 also has an electromechanical or hydraulic differential interlock drive 42 with a differential interlock shaft 44 which ensures the driving of differential interlock means 46 between a differential interlock position DS and a differential release position DF. In order to generate a redundant arrangement, the gearshift interlock shaft 24 and the differential interlock shaft 44 are connected to one another in a drive-transmitting fashion, which is illustrated schematically in FIG. 9 by the reference symbol 60.

The above explanation of the embodiments describes the present invention exclusively within the scope of examples. Of course, individual features of the embodiments can, where technically appropriate, be freely combined with one another without departing from the scope of the present invention.

What is claimed is:

1. A securing device for securing a stationary state of an electric vehicle, said securing device comprising:
   a gearshift interlock device having a gearshift interlock drive with a gearshift interlock shaft for driving a gearshift interlock means between a gearshift interlock position (GS) and a gearshift release position (GF),
   a differential interlock device having a differential interlock drive with a differential interlock shaft for driving a differential interlock means between a differential interlock position (DS) and a differential release position (DF),
   wherein the gearshift interlock shaft and the differential interlock shaft are connected to one another such that movement of the gearshift interlock shaft is transmitted to the differential interlock shaft.

2. The securing device as claimed in claim 1, wherein the differential interlock means has a differential interlock section which, in the differential interlock position (DS), is configured to be positively locked in an opposing differential interlock section.

3. The securing device as claimed in claim 1, wherein the gearshift interlock means and/or the differential interlock means have/has a spring compensation means.

4. The securing device as claimed in claim 1, wherein the gearshift interlock device acts on an input transmission or multi-gear transmission.

5. The securing device as claimed in claim 1, wherein the gearshift interlock shaft and/or the differential interlock shaft have/has a coupling section for coupling the gearshift interlock drive to the differential interlock drive, via the gearshift interlock shaft and/or the differential interlock shaft.

6. The securing device as claimed in claim 1, wherein the gearshift interlock device and/or the differential interlock device have/has a freewheeling section for freewheeling of the gearshift interlock shaft and/or of the differential interlock shaft counter to a drive direction.

7. The securing device as claimed in claim 1, wherein a drive of the gearshift interlock means is embodied as an electromechanical or hydraulic drive.

8. The securing device as claimed in claim 1, wherein a drive of the differential interlock means is an electromechanical or hydraulic drive.

9. An electric vehicle comprising the securing device of claim 1.

* * * * *